Nov. 17, 1964   M. UMANOFF   3,157,871
SHOPPING CART PROVIDED WITH RADIO RECEIVING APPARATUS
Filed March 21, 1960   3 Sheets-Sheet 1
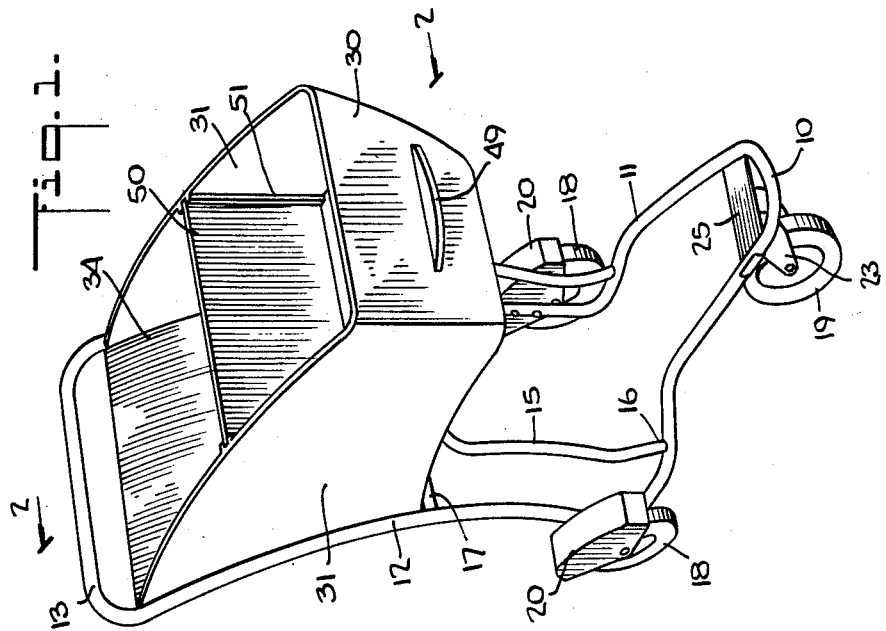
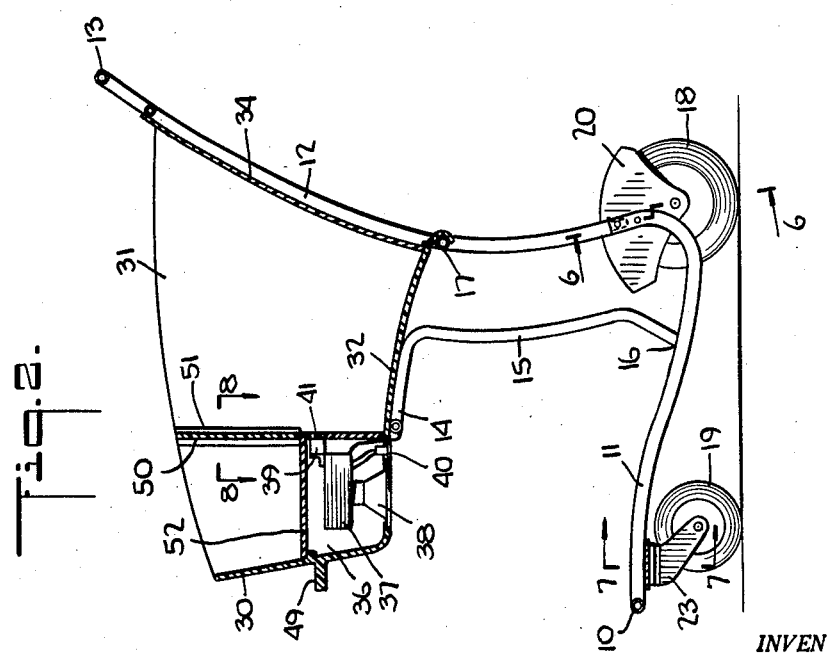
INVENTOR:
MARTIN UMANOFF
BY Frederick Breitenfeld
ATTORNEY Nov. 17, 1964 M. UMANOFF 3,157,871
SHOPPING CART PROVIDED WITH RADIO RECEIVING APPARATUS
Filed March 21, 1960 3 Sheets-Sheet 2
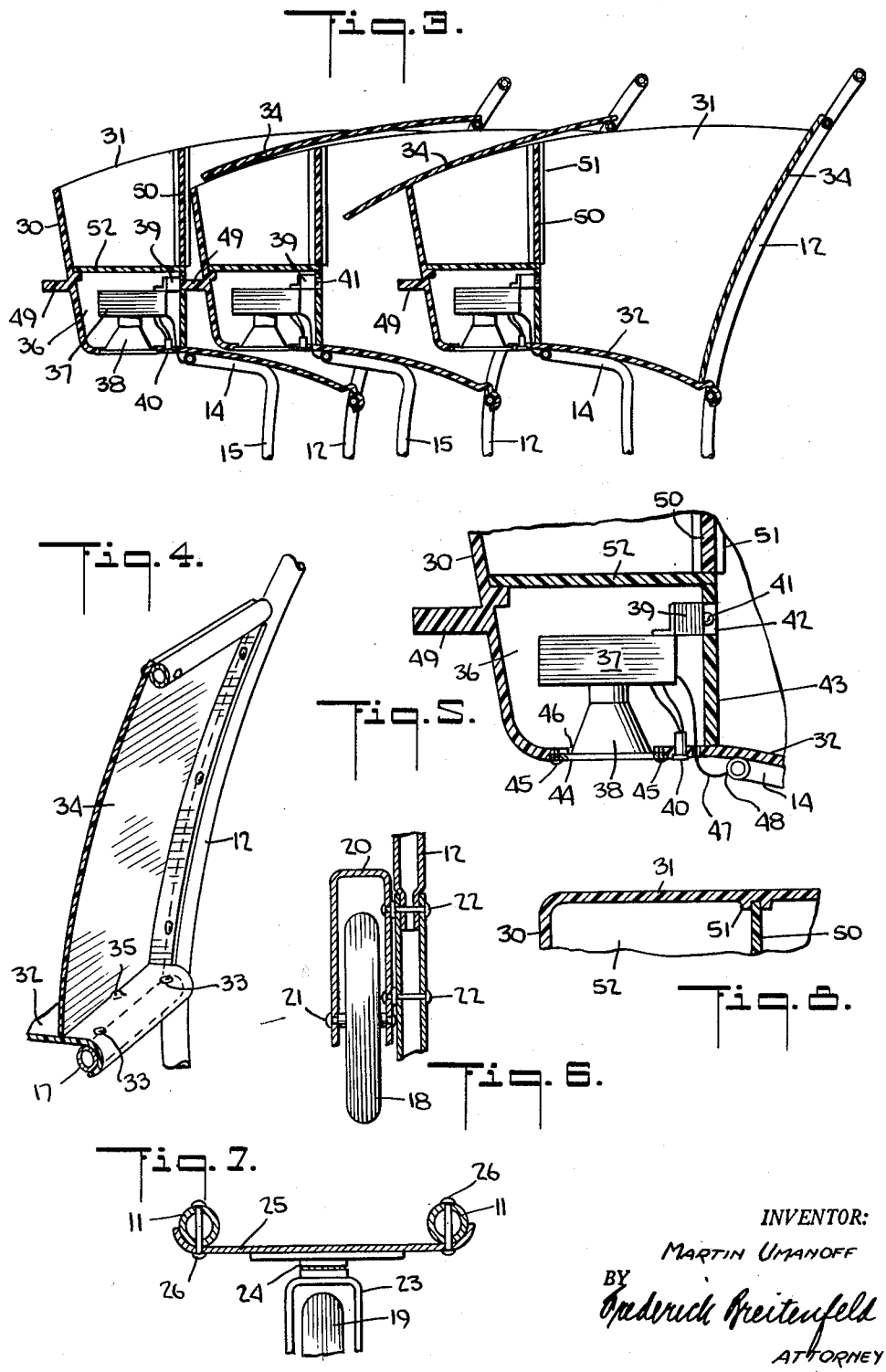
INVENTOR:
MARTIN UMANOFF
BY
Frederick Breitenfeld
ATTORNEY

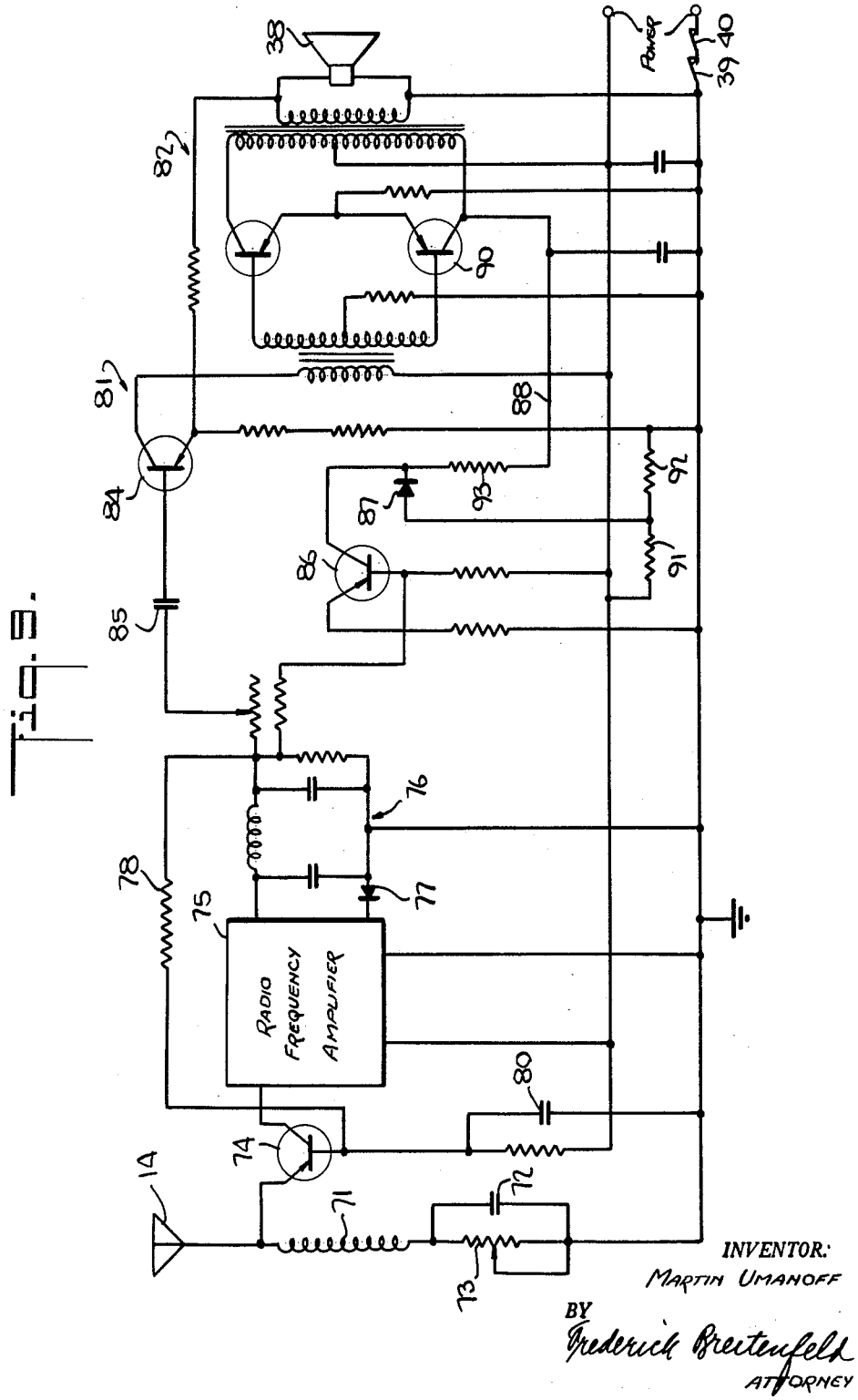

United States Patent Office 3,157,871
Patented Nov. 17, 1964

3,157,871
SHOPPING CART PROVIDED WITH RADIO
RECEIVING APPARATUS
Martin Umanoff, Huntington, N.Y., assignor, by mesne assignments, to R. A. MacPhum Industries, Inc., a corporation of New Jersey
Filed Mar. 21, 1960, Ser. No. 16,206
11 Claims. (Cl. 340—280)

This invention relates generally to shopping carts of the type currently in common use in supermarkets, involving a wheeled under-carriage and a bin mounted thereon and adapted to accommodate mechandise.

It is a general object of the invention to provide a cart of improved structural character, embodying features which not only simplify the manufacture of the cart in commercial quantities, but make the cart lighter in weight, more stable and less top-heavy than usual carts, and more attractive in appearance.

Another object is to provide an improved shopping cart provided with a radio receiving apparatus by means of which advertising messages and other information may be transmitted to the user of the cart from a local broadcasting equipment.

Another objective is to provide a solution to the problem with which markets are confronted, arising from inadvertent, often deliberate, removal of carts from premises. To minimize such losses, it is an object of the invention to provide a practical and effective warning signal system which becomes operative automatically whenever a cart is transported beyond certain predetermined bounds. Toward this end, the invention contemplates the provision of a raucous alarm in association with each cart, in combination with each cart, in combination with a means which automatically normally maintains the alarm ineffective, but which makes the alarm effective when the cart is moved beyond a prescribed area.

One of the special features of the invention resides in the employment of the radio receiving apparatus previously mentioned as a means for controlling the alarm device. In accordance with the invention, the radio receiving apparatus is devoid of readily-accessible disconnect means, and the operation of the alarm is controlled by the strength of the signal received by the apparatus. Thus, if there is a focal radio broadcasting equipment whose signal is only of local strength, diminishing rapidly at increasing distances from its source, it is possible to maintain the alarm ineffective whenever the signal received by the radio apparatus is of predetermined strength, and to cause the alarm to become effective whenever the received signal falls below a predetermined minimum strength.

Another feature of the invention resides in the incorporation of the warning signal within the radio receiving apparatus itself. Preferably the apparatus includes an electrically suppressible howling circuit which is automatically allowed to become effective whenever the cart is moved beyond a certain distance from the broadcasting source.

A further objective of the invention is to provide these improvements, as well as others, in carts of the kind which may be telescopically nested. In a system of this nature, each cart is provided with a bin having a relatively narrow nose, and a rear wall adapted to swing forwardly into the bin under nose pressure of another cart. In accordance with the present invention, each cart of such a set is provided with a normally operative radio receiving apparatus, and a means which is automatically effective to render the receiving apparatus inoperative when the cart is nested with another. Preferably, this automatic means involves a breakable electric circuit, coupled with cooperable means carried by each pair of carts for breaking the circuit of one of them when they are nested.

In the preferred embodiment of the invention, the radio receiving apparatus is mounted in an apertured enclosure, and within the enclosure there is a circuit-disconnecting switch that is operable from the exterior by a special element insertable through the aperture. A special element of this kind is carried by the nose of each cart, so that when it is nested with another cart, the radio unit of the cart in front will be automatically rendered inoperative.

Each cart is also provided with a key-actuatable means whereby the radio unit may be independently shut off by authorized personnel.

Among the structural innovations constituting features of the invention, and contributing to the attainment of the foregoing general objectives, are a simplified under-carriage composed essentially of tubular rods, preferably of metal, a bin structure of unitary character, involving a plastic element having integral front and side walls and a bottom wall, a simplified yet highly effective three-wheeled supporting structure, improved shaping and partitioning of the bin, a practical means for accommodating the hidden radio unit yet having it accessible for repairs, and an efficient means for utilizing the metallic under-carriage as the antenna for the radio apparatus.

One way of achieving these objects and advantages, and such other objectives and benefits as may hereinafter appear or be pointed out, is illustrated in the accompanying drawings, in which—

FIG. 1 is a perspective view of a shopping cart embodying the features of the present invention;

FIG. 2 is a cross-sectional view substantially along the line 2—2 of FIG. 1;

FIG. 3 is a view similar to FIG. 2, showing the manner in which carts of the set may be telescopically nested;

FIG. 4 is a fragmentary perspective view of a detail of the rear bin wall and its mode of support;

FIG. 5 is an enlarged cross-sectional view of the radio unit and enclosure, taken substantially in the same direction as FIGS. 2 and 3;

FIG. 6 is a fragmentary cross-sectional view along the line 6—6 of FIG. 2, illustrating the manner of mounting the rear wheels;

FIG. 7 is a similar fragmentary view along the line 7—7 of FIG. 2, showing the manner of supporting the single front wheel;

FIG. 8 is a fragmentary cross-sectional view along the line 8—8 of FIG. 2, illustrating a detail of the partition structure; and FIG. 9 is an electrical diagram showing the nature of the warning signal and its control.

The under-carriage is composed essentially of three elements of tubular rod material, preferably metal. The main element is bent and shaped to define a V-shaped base adjacent to the floor, the apex 10 of the V being toward the front and the arms 11 diverging rearwardly. At their rear ends, the arms 11 are bent upwardly to define rear posts 12. These are curved convexly forwardly, as shown in FIG. 2, and merge at the top in a transverse section 13 constituting the handle of the cart. The second section of the under-carriage consists of a similar tubular rod bent to form a forwardly directed V-shaped bin platform 14 at an elevated level, the V-arms being bent downwardly at their ends to define posts 15 extending downwardly into securement at 16 with the arms 11 of the V-shaped base. The third element of the under-carriage is a transverse rung 17 extending between and rigidly secured to the posts 12 at a level somewhat below that of the bin platform 14.

The wheels of the under-carriage consist of a pair of rear wheels 18 and a single front swivel wheel 19. Each rear wheel assembly consists of an inverted channel 20 arranged on the outside of, and secured to, the adjacent rear post 12 (see FIG. 6), the wheel 18 having an axle 21 extending between and journaled in the opposite walls of the channel 20. Rivets 22 extending through the post 12 and through the inner wall of the channel 20 secure the wheel assembly rigidly and firmly to the under-carriage structure. It is in the region of the upper rivet 22 that the tubular rod material may be spliced, as indicated in FIG. 6, since the joint is thus in an inconspicuous location, and the rivet 22 serves to hold the joined ends in firm relationship.

The front wheel of the three-wheel arrangement is journaled in an inverted channel or yoke 23 which is in swiveled engagement, at 24 (see FIG. 7), with a supporting plate 25 secured by rivets 26 to the V-arms 11 adjacent to the apex 10 of the V-shaped base.

The bin structure involves a unitary molded element of non-metallic material, such as suitable plastic, comprising a front wall 30, side walls 31, and a bottom wall 32. The rear end of the bottom wall 32 is curved downwardly around the rung 17, as best shown in FIG. 4, and is rigidly secured to this rung by rivets 33. The central region of the bin rests upon the bin platform 14 and is secured thereto by any appropriate means (not shown). It is to be observed that the bottom wall 32 is slightly convex upwardly and slopes downwardly toward the rear support at 17. The front wall 30 slants forwardly upward (FIG. 2) and the top edges of the side walls 31 rise slightly toward the rear, so that the bin structure as a whole has a relatively narrow nose and a depth and width that increase gradually toward the rear.

The rear wall 34 of the bin is separately fabricated, its upper edge extending between and pivotally supported by the rear posts 12, as best indicated in FIG. 4. The wall 34 is free of attachment to the side walls 31 or bottom wall 32 of the bin. The wall 34 slopes downward in a forward direction (FIG. 2), and the lower edge lies in front of a projection 35, or a series of such projections, formed along the rear margin of the bottom wall 32. In this way, the rear wall 34 is free to swing forwardly and upwardly into the bin, as best indicated in FIG. 3, and its rearward swinging movement is limited when it encounters the projection or projections 35, as indicated in FIGS. 2 and 4, and in the wall 34 shown at the right in FIG. 3. In the front lower part of the bin, transverse walls extending between the side walls 31 form a compartment or enclosure 36 within which a radio receiving apparatus 37 may be accommodated. The details of this apparatus have not been illustrated (except in FIG. 9), but it will be understood that the constituent elements are mounted on an appropriate chassis in well-known fashion, and the unit includes a battery (not shown), a speaker 38, and a circuit having a disconnect switch 39 and a key-actuatable switch 40. The switch 39 includes a movable switch element 41 projecting rearwardly through an aperture 42 in the rear wall 43 of the enclosure. The key switch 40 is preferably mounted in the bottom wall 32 of the bin, for access only by authorized persons. The speaker 38 is preferably mounted on a closure plate 44 removably secured as at 45 to the outside of an access opening 46 formed in the bottom wall 32 and through which the entire radio apparatus may be inserted into the enclosure 36.

As indicated at 47, an antenna connection extends out of the enclosure 36 into electrical contact at 48 with the metallic bin platform 14. In this way, the entire metallic under-carriage of the cart is enabled to serve as an antenna for the radio receiving apparatus 37.

In accordance with the invention, the switch 39 is normally closed, so that the radio apparatus is operative. In order to break the electric circuit, by means of the switch 39, pressure must be exerted upon the movable switch element 41 by a special tool or element inserted forwardly through the aperture 42. Each cart is provided on the front wall 30 with a special element of this character, indicated at 49. Where the switch element 41 is simply to be pushed, the element 49 may be, as shown, a simple projection adapted to enter the aperture 42 in the cart ahead of it when nesting is accomplished.

The bin structure is completed by a transverse partition 50 which extends upwardly between the side walls 31 in substantial alignment with the rear wall 43 of the radio unit enclosure. The partition 50 may be a separate element slidably insertable and removable into guideways 51 (see FIG. 8) formed as integral projections on the side walls 31. It affords a means for conveniently dividing the bin into a forward relatively shallow area (for lighter or more delicate commodities, for example), and a deeper rear area into which heavier merchandise items may be placed.

If desired, the partition 50 may be hinged along its lower edge to the transverse line along which the rear enclosure wall 43 and the ceiling wall 52 of the enclosure 36 meet, the hinging being such that the partition 50 may be swung forwardly down onto the ceiling wall 52 when it is not desired. Toward this end, the partition 50 should preferably have a size and shape conforming to that of the ceiling wall 52. The hinged mounting of the partition 50 has not been illustrated.

From the description given, it will be observed that each cart, when in use, is an easily maneuverable device having substantial capacity and unusual stability. The front wheel 19 is positioned forwardly well beyond the center of gravity of the bin, even when loaded. The nesting of the carts, in pairs or multiples, is relatively simple, since the nose of each cart exerts pressure forwardly against the pivoted rear wall of the cart in front, and the mounting of the rear wheel assemblies on the outsides of the rear posts 12 leave ample space for the base of each cart to nest with the base of the cart in front. Moreover, each cart is provided with a constantly-operating radio receiving apparatus, whereby advertising messages or other information, or possibly musical entertainment and the like, may be conveyed to the user. When any two carts are nested with each other, the radio unit of the cart in front is automatically disconnected. Thus, durig working hours, the cart at the rear of any nested assembly is ready to be selected by a patron, with the radio already operative. Whenever desired, either during or after working hours, the end cart of each nested assembly may have its radio disconnected by means of the special key-controlled switch 40.

It will be readily understood that the elements 39 and 49 may be interchanged, without altering the basic nature of the invention. For example, the switch 39 may be located behind an aperture in the front wall 30 of each cart, and each rear wall 43 may be provided with a projection adapted to enter such aperture and actuate the switch in the cart directly behind, when the carts are nested. In such an arrangement, it would be the cart at the head of each line of nested carts which would be constantly operative, so far as the radio apparatus is concerned. However, by pressing the foremost cart against a special wall area, provided with a projection of proper size and character, even this front member of the nested assembly might have its radio automatically disconnected.

The details of the raucous alarm signal, and the manner in which it is controlled, are indicated in FIG. 9. In this figure the antenna has been designated with the reference numeral 14, to conform to the description hereinbefore given. Similarly, the speaker is designated 38, and the switches 39 and 40 are also indicated. The "ground" connection may be established, in the cart, by an electrical connection to the metallic chassis itself, of the radio unit 37.

In the circuit, the antenna 14 is connected in series with a pretuned resonant circuit 71, 72. A volume control 73 comprises a variable resistor connected in shunt across the capacitor 72. The antenna is connected through a transistor 74 to a standard radiofrequency amplifier 75, the output of which is applied to a detector circuit 76. The detector circuit includes a diode rectifier 77 and a filter circuit which includes a series connected inductor and two parallel connected capacitors. The output of the detector circuit comprises a direct current voltage proportional to the amplitude of the received signal and an audiofrequency component proportional to the modulation of the radiofrequency signal.

In order to maintain a substantially constant volume at the loud speaker 38, a negative feed-back is provided from the output of the detector 76 to the base of transistor 74. The audiofrequency is eliminated from this circuit by series resistor 78 and shunt capacitor 80, and only the direct current component is applied to the base of the transistor 74.

The audiofrequency circuit includes a first audio transistor stage 81 and a second push-pull audio-stage 82 connected to the loud speaker 38. The first audio stage includes a transistor 84 with its base connected to the detector circuit in series with a capacitor 85 which eliminates the direct current from the audio signal.

A feature of the audio amplifier lies in an oscillating or howling circuit which is normally rendered inoperative by the direct current produced by the detector circuit. When no signal (or only a very weak signal) is received by the antenna, no (or insufficient) direct current is available from the detector and the oscillating circuit operates to produce a loud raucous tone from the loud speaker. The oscillating circuit includes both stages of audiofrequency 81 and 82 and a positive feedback circuit comprising a transistor 86 and a bias diode 87. The cathode of the diode is connected by conductor 88 to a collector of one of the transistors 90 in the push-pull stage 82. The cathode is also connected to the collector of control transistor 86, and the anode of the diode is connected to the mid-point of a voltage divider 91, 92 bridged across the power supply. The base of transistor 86 is connected to the detector circuit (and to ground), while the emitter is connected to ground only.

When the circuit is operating and receiving a normal radio signal, the detector provides a direct current voltage which biases the base of transistor 86 and makes it conductive, passing direct current from conductor 88, through resistor 93, to the collector and the emitter in transistor 86, to ground. This direct current produces a voltage drop across resistor 93 which makes diode 87 conducting and diverts the audiofrequency from transistor 90 to ground through resistor 92. Since the A.C. from the push-pull stage cannot get back to the input circuit of transistor 84, the circuit does not oscillate.

When there is no signal received by the antenna, or when the signal is weak, the base of transistor 86 is biased to cut-off, and the direct current through conductor 88 is reduced, raising the voltage of one side of the diode so that it is made nonconductive. The audio signal from transistor 90 flows through the collector base electrodes of transistor 86, then through capacitor 85, to the input base electrode of the first audio stage transistor, and positive feed-back is established, causing the audio amplifier to oscillate and thus produce the warning signal.

It is thus apparent that when the cart is in use within the supermarket, no sounds emanate from the speaker 38 except the advertising or other message received from the focal broadcasting equipment within or closely adjacent to the market. However, should the patron inadvertently or deliberately move the cart beyond the proper distance from its area of use, the weakening of the received signal will result in activation of the warning signal, thus alerting the patron himself, as well as others, to the circumstance that the cart has been removed beyond authorized limits.

In many respects it will be understood that the details herein described and illustrated may be altered by those skilled in the art, without necessarily departing from the spirit and scope of the invention as expressed in the appended claims.

What is claimed is:

1. In a set of identical shopping carts in which each cart comprises a wheeled under-carriage and a bin mounted thereon, said bin having a relatively narrow nose and a rear wall adapted to swing forwardly into the bin under nose pressure of another cart, whereby the carts of the set may be telescopically nested: the combination of a normally operative radio receiving apparatus carried by each cart, and means automatically effective to render said receiving apparatus inoperative when the cart is nested with another.

2. The combination defined in claim 1, in which said means comprises a breakable electric circuit for said apparatus, and cooperable means carried by each pair of carts for breaking the circuit of one of them when they are nested.

3. The combination defined in claim 2, in which said cooperable means comprises a switch in the circuit to be broken, and a switch actuator carried by the other cart of the pair.

4. The combination defined in claim 1, in which said receiving apparatus includes an apertured enclosure and a disconnect switch within the enclosure and operable from the exterior by a special element insertable through said aperture, said automatically effective means comprising a special element of the kind mentioned carried by the nose of each cart.

5. The combination defined in claim 1, in which said radio receiving apparatus includes circuitry defining an electrically suppressible howling circuit and means for maintaining it suppressed only so long as the received signal is of predetermined minimum strength.

6. In a set of identical shopping carts in which each cart comprises a wheeled under-carriage and a bin mounted thereon, said bin having a relatively narrow nose and a rear wall adapted to swing forwardly into the bin under nose pressure of another cart, whereby the carts of the set may be telescopically nested: the combination of a normally operative radio receiving apparatus carried by each cart in the forward part of the bin, an enclosure for said apparatus, said enclosure having a rearwardly facing aperture, an electric circuit within said enclosure including a disconnect switch operable from the exterior by a special element insertable through said aperture, and a special element of the kind mentioned carried externally on the nose of each cart and adapted to enter the aperture in the cart ahead to render the receiving apparatus of the cart ahead inoperative when said carts are nested together.

7. The combination defined in claim 6, including also a key-actuatable means on each bin for independently rendering the receiving apparatus inoperative.

8. In a shopping cart, a metallic wheeled under-carriage including a bin platform and a bin mounted thereon, said bin having integral side, front and bottom walls of molded non-metallic material, said bottom wall having an opening therein and a removable cover plate secured on the outside of said opening, an enclosure within the bin above said opening, and a radio receiving apparatus mounted on said cover plate and adapted to be accommodated within said enclosure when the cover plate is secured beneath said opening, said radio apparatus including a downwardly directed speaker mounted on said cover plate and an antenna connection extending through said bottom bin wall into electric connection to said bin platform whereby the under-carriage of the cart serves as the antenna for said radio apparatus.

9. For use in connection with a mobile structure intended to be moved about freely within a prescribed area but not to be removed from said area: a radio transmitter located within said area for broadcasting a signal whose strength diminishes with increasing distance from said transmitter, a radio receiving apparatus carried by said mobile structure tuned to receive the signal emanating from said transmitter, said radio receiving apparatus being devoid of readily accessible disconnect means, an alarm carried by said mobile structure, and means also carried by said mobile structure responsive to said signal when the latter is above a minimum strength for rendering said alarm inoperative, said means permitting said alarm to become operative when said signal falls below said minimum strength, said signal being above said minimum strength within said prescribed area but below said minimum strength outside said area whereby when said mobile structure is removed from said area said alarm becomes operative.

10. For use in connection with a mobile structure intended to be moved about freely within a prescribed area but not to be removed from said area: a radio transmitter for broadcasting a signal whose strength diminishes with increasing distance from said transmitter, a radio receiving apparatus carried by said mobile structure tuned to receive the signal emanating from said transmitter, said radio receiving apparatus being devoid of readily accessible disconnect means, and said radio receiving apparatus including a howling circuit and means responsive to said signal when the latter is above a minimum strength for rendering said howling circuit inoperative, said means permitting said alarm to become operative when said signal falls below said minimum strength, said signal being above said minimum strength within said prescribed area but below said minimum strength outside said area whereby when said mobile structure is removed from said area said howling circuit becomes operative.

11. For use in connection with a wheeled shopping cart intended to be moved about freely within a prescribed shopping area: a local radio transmitter located within said area for broadcasting a signal of predetermined frequency, and a radio receiving apparatus carried by said cart and tuned to receive only the signal emanating from said transmitter, said shopping cart having an enclosure adapted to contain said radio receiving apparatus and said enclosure including means preventing ready access to said radio receiving apparatus.

References Cited in the file of this patent

UNITED STATES PATENTS

| | | |
|---|---|---|
| D. 188,841 | Umanoff | Sept. 20, 1960 |
| 2,415,654 | Place | Feb. 11, 1947 |
| 2,607,887 | Gissler et al. | Aug. 19, 1952 |
| 2,831,178 | Ensink et al. | Apr. 15, 1958 |
| 2,870,325 | Sanger | Jan. 20, 1959 |
| 2,906,542 | Hoedinghaus et al. | Sept. 29, 1959 |
| 2,942,066 | Margolin | June 21, 1960 |
| 3,015,494 | Fosbrook | Jan. 2, 1962 |

FOREIGN PATENTS

| | | |
|---|---|---|
| 861,197 | France | Feb. 3, 1941 |

OTHER REFERENCES

Electrical Engineering, December 1939, pp. 509–513.